July 8, 1941.  A. B. LOW  2,248,368

APPARATUS FOR CRACKING NUTS

Original Filed Nov. 25, 1938

INVENTOR.
Arthur B. Low.
BY
Chas. E. Townsend.
ATTORNEY

Patented July 8, 1941

2,248,368

UNITED STATES PATENT OFFICE 2,248,368

APPARATUS FOR CRACKING NUTS

Arthur B. Low, Denver, Colo., assignor to The Regents of The University of California, Berkeley, Calif., a corporation of California Original application November 25, 1938, Serial No. 242,128. Divided and this application January 15, 1941, Serial No. 374,486

4 Claims. (Cl. 146—8)

This invention relates more particularly to an apparatus for cracking nuts and for separating the shells from the meat. The invention may also be employed in peeling citrus fruits.

This application is a division of my original application Serial No. 242,128, filed November 25, 1938.

Nuts are a valuable food product and the consumption of nut meats is constantly increasing. Shelled nut meats are in demand and the proportion of nuts to nut meat sold is decreasing, which shows that the public prefers to buy the meat separated from the shell, even at higher prices.

Nuts, such as pecans, are now cracked and shelled almost exclusively by hand and this is slow work, which in turn requires the workers to accept a scale of pay that is abnormally low. Unless such low pay scale is used, the nut meat, from the pecan especially, cannot compete in the market with other nut meats such as cashews.

It is the object of the invention to effect the shelling, by mechanical means, of nuts, such as pecans, English walnuts and, in fact, almost every kind of hard-shelled nuts, whereby the nuts may be cracked and the meat separated from the shell at a high rate of speed and with the expenditure of a comparatively small amount of labor.

I have found by experiment that if a hollow puncturing tool is connected with a reservoir containing a gas under high pressure, and inserted through the shell of a nut, the latter will burst and be broken into many pieces by the shattering effect of the explosion. By continuing the delivery of gas for a short period after the shell has cracked, the expansion of the gas as it leaves the needle or puncturing tool will scatter the particles which are then subjected to the winnowing action of a blast of air whereby the meat is separated from the shells. Instead of introducing gas under high pressure, it is possible to introduce an explosive gas mixture and explode the same by means of an electric spark and the resultant explosion will shatter the nut. Owing to the fact that the nut meats are to be used for food, it is necessary to select the explosive with care as it must not leave any objectionable taste or odor. One explosive gaseous mixture that can be used for this purpose is composed of one part of oxygen and two parts of hydrogen, which combined with explosive violence to form water ($H_2O$).

For cracking nuts the use of compressed air is satisfactory and this can be compressed to about 200 pounds per square inch and stored in suitable containers. Carbon dioxide can also be used for this purpose.

For peeling citrus fruit it is possible and sometimes preferable to employ a liquid, such as water, which is injected between the inside of the rind and the outside of the pulp envelope under sufficient pressure to separate the rind from the pulp.

In order to more clearly describe the invention reference will now be had to the accompanying drawing in which a simple machine has been shown by means of which the method can be carried out and in which—

Figure 1:
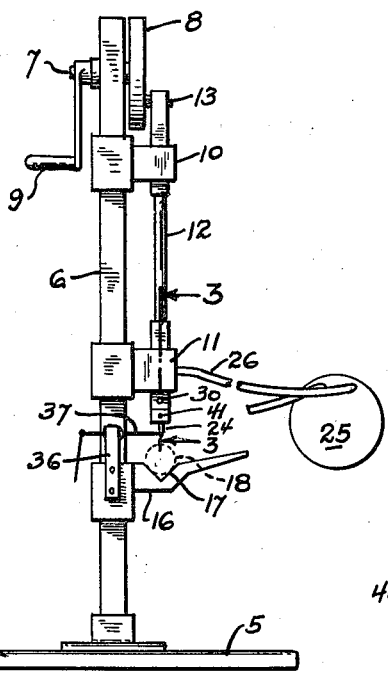
Fig. 1 is a side elevation of the machine.
Figure 2:
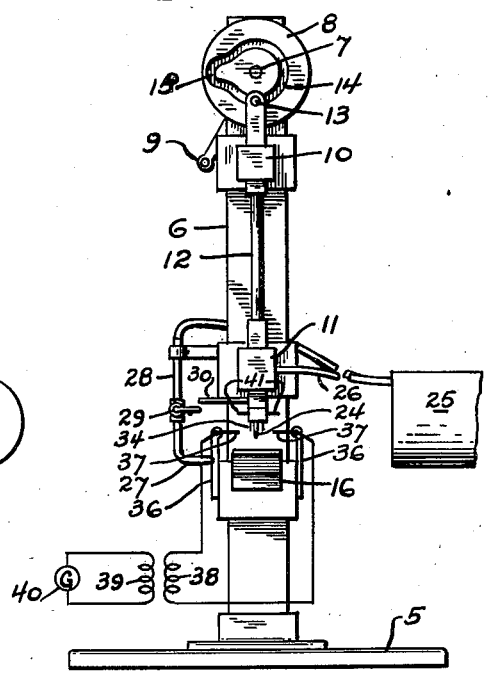
Fig. 2 is a front elevation thereof.

The apparatus shown on this drawing is merely intended to illustrate means for accomplishing some of the important steps and does not show the actual machine which is specifically different. In the drawing a base 5 is shown which rests on the floor and from the upper surface of which a standard 6 projects upwardly. Journalled in a bearing in the upper end of the standard is a shaft 7 having a disk 8 attached to one end and a crank 9 attached to the other end which merely illustrates means for rotating the shaft. Secured to the standard 6 are two bearing blocks 10 and 11 which have bearings in axial alignment. A rod 12 is mounted in the bearings for reciprocation therein and this is provided at its upper end with a pin which travels in the cam slot 14 and reciprocates the rod 12 in accordance with the distance of the corresponding portion of the slot from the center of rotation. Slot 14 has one outward curve 15 that effects a sharp reciprocation of rod 12 when this portion reaches the pin 13.

Figure 3:
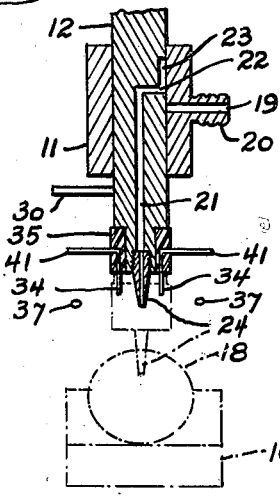
Fig. 3 is a section taken on line 3—3, Fig. 1.

A shelf 16 is positioned below the lower bearing and is provided with a V notch 17 that supports the nut 18 which is to be cracked. Referring now more particularly to Fig. 3 it will be seen that bearing 11 has radial opening 19 that extends through the wall and through the nipple 20. The rod 12 has a central opening 21 that terminates in a radial opening 22 which, in turn, connects with a short groove 23. A hollow steel needle 24, preferably flattened at its lower end, is removably attached to the rod 12. Air or other suitable gas is maintained under pressure in a tank 25 which is in communication with the nipple 20 through a hose 26. When the rod 12 is in its normal position, as shown in Fig. 3, opening 19 is closed by the surface of rod 12, but when the latter is moved downwardly in response to the action of the curved portion 15 of cam groove 14, the tip of needle 24 first contacts and then punctures the shell of the nut and at the time of puncture opening 22 comes into alignment with opening 19 and gas under pressure is forced into the interior of the nut. The pressure must be sufficient to burst the shell and does not have to be very large for paper shell pecans, but must be quite great for black walnuts and butternuts. When the shell bursts the meat and the shell fragments are scattered to all sides and in the actual machine this part is enclosed in a housing so as to prevent particles from being scattered over the room. The presence of the groove 23 makes it possible to deliver compressed gas for a short period after the shell has burst. A nozzle 27 is connected with the reservoir 25 by means of a pipe 28 which is provided with a valve 29 which is normally retained in closed position and which is momentarily opened when the rod 12 returns to its normal position, means for this purpose has been shown and designated by numeral 30. The blast of air from nozzle 27 serves to clear notch 17 of all nut particles. After the nuts have been cracked and shattered, the particles are put into a hopper 31 underneath which an endless belt 32 travels and when the particles drop from the belt, they pass through a blast of air produced by a fan 33 which separates the heavy meat from the lighter shells, the former dropping into a bin "A" and the latter into bin "B".

If it is desired to inject into the nuts an explosive gas mixture and afterward explode the same, the same machine can be used, but it must be slightly modified. The groove 23 may be omitted because a prolonged blast of gas is not needed. If oxygen and hydrogen are used, they must not be mixed in the tanks, but at the earliest in opening 21, and better still, not until they reach the penetrating needle 24, and this requires two separate nipples 20 and preferably two openings 21 connected directly above 24. In order to ignite the gas to explode it, two steel points 34 are secured to and insulated from the rod 12 as by insulating blocks 35. The two points have been shown on opposite sides of the injector nipple 24, but may be on the same side but insulated from each other and spaced apart. It is also possible to use one steel point 34 and use the injector nipple for one electrode. Attached to the base of bracket 16 are two brackets 36 provided with transverse openings through which resilient wires 37 pass and from which they are insulated. These wires are connected to the secondary 38 of a high tension transformer whose primary 39 is connected with a source of alternating current 40. When the rod or plunger 12 moves downwardly, the ends 41 of points 34 contact springs 37 and sparks then pass between the points and ignite the gas to produce an explosion.

Figure 5:
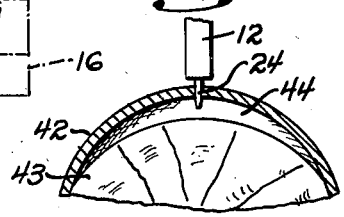
Fig. 5 is a section through a portion of a citrus fruit showing one step of the method practiced thereon.

In Fig. 5 numeral 42 represents the rind of a citrous fruit such as a grapefruit and 43 the pulp, while the space 44 shows how the pulp is parted from the rind by the fluid introduced through needle 24. In peeling fruit a liquid is used instead of gas.

Figure 4:
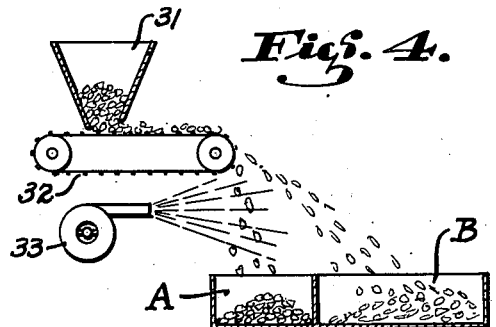
Fig. 4 is a diagrammatic view showing a simple mechanism for effecting the winnowing operation.

In the above portions of this specification a specific mechanism has been described for the purpose of illustrating the invention. The several steps include the production of an internal pressure great enough to burst the shell or to introduce an explosive gas and then igniting the same, which is followed by a winnowing action effected by a machine similar to that shown in Fig. 4. The winnowing machine may be some form of grain or seed cleaning and separating machine modified as may be necessary to obtain the best results.

In some cases it is necessary, and in most cases it is desirable, to soak the nuts before subjecting them to the puncturing operation, as the shells are then less liable to crack and this also reduces the tendency of the meat to break.

Having thus described my invention, what I claim and desire to secure by Letters Patent is:

1. A machine for shelling nuts, comprising in combination a support, a shelf for supporting a nut, a bearing, a plunger mounted for reciprocation therein, means for reciprocating the plunger towards and away from the shelf, the end of the plunger nearest the shelf having a tubular pin for perforating the shell of a nut positioned on the shelf, a source of means for flowing an explosive gas through the pin and into a nut when the pin is in nut puncturing position, and means for igniting the gas in the nut whereby the latter explodes and shatters the nut.

2. A machine for shelling nuts, comprising in combination, a support, a shelf for supporting a nut, a bearing, a plunger mounted for reciprocation therein, means for reciprocating the plunger towards and away from the shelf, the end of the plunger nearest the shelf having a tubular pin for perforating the shell of a nut positioned on the shelf, a source of explosive gas in communication with the interior of the pin, a valve mechanism controlled by the reciprocation of the plunger for flowing gas through the pin and into the nut when the pin is in nut puncturing position, and means for passing an electrical spark through the interior of the nut for effecting an explosion of the gas therein.

3. A machine for shelling nuts, comprising in combination, a support, a shelf for supporting a nut, a bearing, a plunger mounted for reciprocation therein, means for reciprocating the plunger towards and away from the shelf, the end of the plunger nearest the shelf having a tubular pin for perforating the shell of a nut positioned on the shelf, a source of explosive gas in communication with the interior of the pin, a valve mechanism controlled by the reciprocation of the plunger for flowing gas through the pin and into the nut when the pin is in nut puncturing position, a pointed electrode carried by the plunger and insulated therefrom, said electrode being spaced from the pin and positioned to perforate the nut simultaneously with the pin and means for producing an electric spark from said electrode while both the pin and the electrode are in nut puncturing position whereby the gas will be exploded and the shell of the nut shattered.

4. A machine for shelling nuts, comprising in combination, a support, a shelf for supporting a nut, a bearing, a plunger mounted for reciprocation therein, means for reciprocating the plunger towards and away from the shelf, the end of the plunger nearest the shelf having a tubular pin for perforating the shell of a nut positioned on the shelf, a source of explosive gas in communication with the interior of the pin, a valve mechanism controlled by the reciprocation of the plunger for flowing gas through the pin and into the nut when the pin is in nut puncturing position, a pointed electrode carried by the plunger and insulated therefrom, said electrode being spaced from the pin and positioned to perforate the nut simultaneously with the pin, a high tension electric current supply, and a switch operated by the plunger for connecting the electrode to one terminal thereof, when it is in nut puncturing position whereby a spark will pass from the electrode and ignite the gas thereby causing the latter to explode and to shatter the shell of the nut.

ARTHUR B. LOW.